United States Patent Office 2,921,052
Patented Jan. 12, 1960

2,921,052

POLYESTERS OF SULFONYLDIBENZOIC ACID AND GEM-DIALKYL GLYCOLS

John R. Caldwell and John W. Wellman, Kingsport, Tenn., assignors to Eastman Kodak Company, Rochester, N.Y., a corporation of New Jersey No Drawing. Application August 17, 1955
Serial No. 529,076

12 Claims. (Cl. 260—75)

This invention relates to highly polymeric linear polyesters having a high heat distortion temperature in fiber and sheet form without necessity for cold-drawing. These polyesters contain primary recurring structural units derived from a gem-dialkyl glycol and 4,4'-sulfonyldibenzoic acid. This invention also includes polyesters which contain secondary recurring structural units derived from aliphatic and/or aromatic diabasic acids such as terephthalic acid, dimethylmalonic acid, succinic acid, etc. These polyesters can be formed into useful fibers and films which are characterized by high melting points, excellent heat-distortion characteristics, improved solubility in organic solvents, and superior electrical characteristics. Moreover, these properties are present in the unoriented fibers and films to an unexpected degree.

Polyesters have been described which are derived from a dibasic organic acid and neopentylene glycol. This glycol is more specifically referred to as 2,2-dimethyl-1,3-propanediol. These known polyesters such as those derived from terephthalic acid have useful properties but are not characterized by the same advantageous attributes possessed by the polyesters described in this invention. In fact the prior art shows that polyesters of terephthalic acid and 2,2-dimethyl-1,3-propanediol are easily crystallized as contrasted to the lack of crystallinity in terephthalic polyesters of branched chain glycols. As unexpected property of the polyesters described in the present specification is their ability to be crystallized only with great difficulty.

It has been recognized in the art that there are many possibilities for variation in the manufacture of polyesters as well as of the other types of synthetic resins. It is also recognized that no two distinct polymers have the same combination of physical and chemical properties. The polyesters provided herein present a unique contribution to the art whereby an especially advantageous combination of properites are achieved.

In the earlier work in our laboratories on polyesters of 4,4'-sulfonyldibenzoic acid it was thought that only the straight chain aliphatic polymethylene glycols would prove to be of especially noteworthy utility; this is indicated in the application filed by one of us (J.R. Caldwell) on February 10, 1950 (now U.S. Patent 2,614,120, issued on October 14, 1952) which was followed by copending applications 313,061 et seq. filed October 3, 1952, now U.S. Patent 2,744,089 et seq. issued on May 1, 1956.

We have made the additional discovery (as is described herein) that valuable polyesters can be produced from 4,4'-sulfonyldibenzoic acid employing a gem-dialkyl glycol in lieu of the straight chain glycols or in partial replacement thereof. The present application somewhat parallels the disclosure of Caldwell application Ser. No. 313,061 (now U.S. Patent 2,744,089); Serial No. 313,063 (now U.S. Patent 2,744,091); Ser. No. 313,064 (now U.S. Patent 2,744,092); and Ser. No. 313,066 (now U.S. Patent 2,744,094). Moreover, the concept described herein can also be applied to the polyesters described in Caldwell application Ser. No. 313,062 (now U.S. Patent 2,744,090); Ser. No. 313,065 (now U.S. Patent 2,744,093); and Ser. No. 313,067 (now U.S. Patent 2,744,095).

The polyesters described herein possess several unexpected and highly advantageous properties which could not be predicted from related situations. This is especially the case when the glycolic compounds employed consist of at least 50% of a gem-dialkyl glycol. It is most advantageous to employ substantially 100% of a gem-dialkyl glycol.

It is accordingly an object of this invention to provide novel linear polyesters derived from 4,4'-sulfonyldibenzoic acid and gem-dialkyl glycols.

It is an additional object of this invention to provide such linear polyesters wherein a third constituent in the form of a dibasic acid or derivative thereof is introduced for its advantageous modifying effects.

Another object of this invention is to provide linear polyesters having high melting points accompanied by improved solubility properties as relate to a wide range of organic solvents.

Another object of this invention is to provide linear polyesters which can be drawn to form fibers which can be twisted into yarns and woven into fabrics of improved utility.

A further object of this invention is the provision of linear polyester sheets or films having especially advantageous properties.

An additional object of this invention is to provide a linear polyester which can be extruded or compression molded to form shaped objects such as rods, tubes, strips, and other individually shaped items, etc.

A further object of this invention is to provide a film base for supporting photographic emulsions for either black and white or color photography.

An additional object of this invention is to provide solutions of high melting polyesters which are stable at ordinary temperatures and which can be employed for casting films, etc.

A further object of this invention is to provide sheets, films, coating materials and the like which have excellent dielectric properties which are uniform over a wide temperature range and can be advantageously employed in the manufacture of insulated electrical conductors, electrical condensers, insulators, etc.

An additional object of this invention is to provide linear polyesters which have excellent physical properties including excellent heat distortion characteristics in the as-extruded condition without necessity for cold drawing.

Another object of this invention is to provide linear polyesters which are difficult to crystallize whereby there is excellent resistance to the development of brittleness with aging.

A still further object of this invention is to provide linear polyesters according to the objects already presented which also possess excellent general physical characteristics such as good tear strength, good tensile yield strength, good toughness, etc. and which properties are not significantly affected by the presence of water or by the effects of high humidity (superior resistance to hydrolysis).

Still further objects of this invention will become apparent from the following description and claims.

According to a principal embodiment of this invention there is provided a highly polymeric linear polyester having a high heat distortion temperature in fiber and sheet form without necessity for cold-drawing which comprises the condensation product of a 4,4'-sulfonyldibenzoic compound and a gem-dialkyl glycolic compound producing a polymer containing primary recurring units having the following formula:

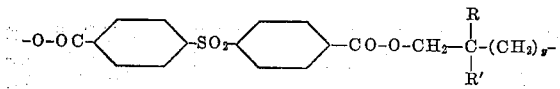

wherein R and R' each represents a radical selected from the group consisting of methyl and ethyl radicals and y represents a positive integer of from one to three.

The primary recurring units can advantageously be interspersed with secondary recurring units advantageously selected from those having the following formulas:

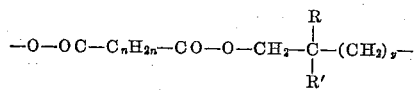

and

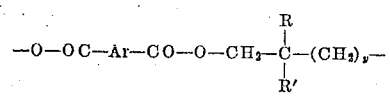

wherein n represents a positive integer of from 2 to 18 and Ar represents a divalent aromatic radical containing from 6 to 18 carbon atoms and which is connected to the carbonyl constituents as shown in the above formulas by direct attachment to a carbon atom of a benzene ring.

Examples of the acids and the glycols from which these recurring units are derived will become apparent from the description of the processes involved in preparing these polyesters as described below. The proportions of the modifying acid which can be present within the polyester structure without adversely affecting the desirable characteristics of the class of polymers with which this invention is concerned depend upon the particular acids which are employed in the process for preparing these polyesters. For example almost all of the sulfonyldibenzoic acid radicals can be replaced by radicals derived from dimethylmalonic acid whereas it is advantageous to limit the replacement of such radicals with those derived from succinic acid to about 30%. A copending application by J. R. Caldwell filed on March 20, 1956, Ser. No. 572,633, covers polyesters of dimethylmalonic acid in the absence of sulfonyldibenzoic acid.

According to another embodiment of this invention there is provided a process for preparing a highly polymeric linear polyester having a high heat distortion temperature in fiber and sheet form without the necessity for cold-drawing, which comprises condensing 1 mole proportion of a sulfonyldibenzoic compound having the following formula:

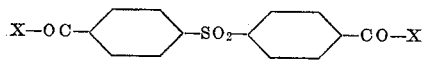

wherein X represents a member selected from the group consisting of alkoxy radicals containing from 1 to 4 carbon atoms, a hydroxy radical, a chlorine atom and a bromine atom, with at least 1 mole proportion of a glycolic compound having the following formula:

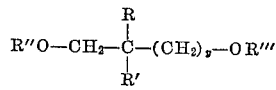

wherein R and R' each represents a radical selected from the group consisting of methyl and ethyl radicals, y represents a positive integer of from one to three and R" and R''' each represents a member of the group consisting of an acyl radical containing from 1 to 4 carbon atoms and a hydrogen atom, the condensation being conducted in the presence of a catalytic condensing agent at a temperature of from about 180° to about 230° C. to form an intermediate condensation product, and then heating at a higher temperature up to about 300° C. at a low pressure of an inert atmosphere to form a polyester having a heat distortion temperature above 100° C.

According to a more specific embodiment of this invention there is provided a process as just described wherein the intermediate condensation product called a "prepolymer" is cooled sufficiently to harden and is then comminuted to a powder, after which the heating at a higher temperature is not permitted to exceed the softening point of the powder. This is called the solid-phase technique or process for polymerization.

The gem-dialkyl glycols which can be employed in accordance with the process of this invention include neopentylene glycol which is also called 2,2-dimethyl-1,3-propanediol, 2,2-diethyl-1,3-propanediol, 2-ethyl-2-methyl-1,3-propanediol, 2,2-dimethyl-1,4-butanediol, 2,2-diethyl-1,4-butanediol, 2,2-dimethyl-1,5-pentanediol, etc. It is generally most advantageous to employ neopentylene glycol.

The sulfonyldibenzoic compound employed in accordance with the process is most advantageously a lower alkyl ester of the acid such as the methyl, ethyl, propyl, isobutyl, isopropyl, n-butyl, sec.-butyl, etc. diester. However, free sulfonyldibenzoic acid can be employed as well as the acid halide. Modifications in the process required to adapt it to the employment of the free acid and acid halide consist primarily in the employment of a catalytic condensing agent especially suited to the sulfonyldibenzoic compound being employed. For example, a tertiary organic amine is desirable as the catalyst when the acid chloride is being condensed. Ordinary esterification catalysts can be employed when the free acid is employed, especially at the beginning of the condensation. Ester interchange catalysts can be advantageously added after the preliminary condensation (called stage I) is complete.

The examples of the dibasic acids which can be employed in conjunction with the sulfonyldibenzoic acid include succinic, glutaric, adipic, azelaic, sebacic, dimethylmalonic, 3,3-diethylsuccinic, 4-ethylsuberic, 2,3-dimethylglutaric, isophthalic, terephthalic, phthalic, 4,4'-methylenedibenzoic, 2-methylterephthalic, 4,4'-benzophenone-dicarboxylic, 4,4'-diphenic, 1,2-di(p-carboxyphenyl)-ethane, 1,2-di(p-carboxyphenoxy)ethane, etc.

These and other acids coming within the scope of the process described above are most advantageously employed in the form of lower alkyl diesters derived from aliphatic alcohols such as those mentioned above for sulfonyldibenzoic acid. The modifying acids are generally employed in molecular percentages (based on the total amount of acids being employed) of up to about 30%. Some of these acids which are characterized by the capacity to form linear polyesters having unusually high melting points can be employed in higher percentages for example, terephthalic acid and the other aromatic acids containing only para-linkages on the benzene rings can be employed up to 50%; dimethylmalonic acid can be employed up to well over 90% as discussed above and is a peculiar exception to the general rule that branched chain aliphatic acids produce lower softening temperatures. It is generally undesirable to employ percentages higher than those mentioned since some of the exceptional properties otherwise provided by the polyesters of this invention may be unfavorably altered to a significant extent. For example, the higher heat distortion temperatures of the polyesters of this invention may be significantly reduced.

In carrying out the process of this invention it is generally advantageous to react a 4,4'-sulfonyldibenzoic acid diester or mixed acid diesters with about 25 to about 100 mol percent excess of the gem-dialkyl glycol in the presence of a suitable catalytic condensing agent. Mixtures of the gem-dialkyl glycols can be advantageously employed or mixtures can also be employed of one or more of these gem-dialkyl glycols with a minor proportion of an alkylene glycol such as ethylene, tetramethylene, pentamethylene, or decamethylene glycol or lower alkanoic esters thereof. Such glycolic compounds include any of the polymethylene glycols containing up to 10 carbon atoms. Moreover, aromatic glycols can also be employed as well as cyclic aliphatic glycols, e.g. quinitol. However, it is preferred not to employ more than about 25 mol percent of such additional glycols based on the total weight of glycolic compounds employed. Higher percentages of these additional glycols can be used but they tend to decrease the advantageous characteristics associated with the polyesters described herein.

The catalytic condensing agents which can be employed include most of the esterification catalysts and the ester interchange catalysts. The catalyst which can be most advantageously employed when condensing dibasic acid diesters include the alkali metals, the alkaline earth metals, the oxides of these two groups of metals, the alkoxides containing from 1 to 6 carbon atoms of these metals, the carbonates and borates of these two groups of metals, lead oxide, bimetallic complexes described in copending applications Ser. Nos. 313,072–313,078, filed by J. R. Caldwell and others on October 3, 1952, and various other similar catalysts described in the prior art. Although most of the catalysts cited in the prior art may be used, it has been found that certain catalysts give superior results. The aluminum and titanium alkoxide complexes described in copending applications Ser. Nos. 313,077 and 313,072 are especially advantageous catalysts for the preparation of the polyesters described herein. These catalysts are bimetallic alkoxides containing titanium and aluminum in combination with alkali metals or alkaline earth metals.

The catalytic condensing agents are advantageously employed in percentages from about 0.001% up to about 0.1% or more based on the weight of the materials being condensed. It is generally advantageous to employ them in a quantity between about 0.01% and about 0.06%. There is nothing especially critical about the percent of these catalysts employed.

The condensation reaction is advantageously conducted in two separate stages which can be called stage I and stage II. The first stage of the reaction begins with the initial heating of the materials being condensed to a temperature of somewhere in the range of 150° to about 230° C. This heating is ordinarily conducted at atmospheric pressures although the pressure can be reduced somewhat in order to speed up the distillation of alcohol which is formed by ester interchange. During stage I lower molecular weight glycol esters are produced which include some polymeric material.

It is especially advantageous to conduct all stages of the reaction in a manner designed to exclude oxygen and extraneous moisture. An inert atmosphere is advantageously employed such as nitrogen, hydrogen, helium, argon, etc. When the acids are employed in the form of their esters there will be no significant amount of moisture during the stage I operation. When the free acids are employed, water will be evolved during the stage I process and is advantageously removed from the reaction mixture as rapidly as its evaporation will permit. This is facilitated by the use of an inert gas to carry away the gases volatilized from the reaction mixture.

Stage II is considered as beginning after substantially all of the volatile material has been removed at the lower temperatures employed during stage I. Stage II is designed to remove the excess glycol and to achieve a high degree of polymerization. This is ordinarily accompanied by the employment of temperatures well above 200° C. and ordinarily within the range of 250°–300° C. depending upon the melting point of the polyester being produced. During the course of stage II the evaporation of excess glycol is facilitated by the employment of a high vacuum together with agitation so as to provide as much surface exposure as possible thereby facilitating the escape of volatile products from the highly viscous melt. Some inert gas can be advantageously introduced into the reaction vessel during stage II.

Stage II can be advantageously interrupted after the preparation of an intermediately polymerized product (called a "prepolymer") by stopping the reaction and cooling the prepolymer sufficiently to permit it to harden. This intermediate condensation product or prepolymer should advantageously possess an inherent viscosity from about 0.15 to about 0.3. This prepolymer is then pulverized or otherwise comminuted to a relatively fine particle size. The size of the particles is not of any particular importance although it is generally advantageous to employ a particle size from about 0.01 to about 0.03 inch. The powdered prepolymer can then be advantageously heated in a high vacuum under the conditions described above during the latter portion of stage II. Care should be exercised that the temperature employed does not exceed the melting point of the powder. This can generally be accomplished by gradually increasing the temperature whereby it is maintained at somewhat below the softening temperature of the powder while the powder is acquiring a very high degree of polymerization. During this solid-phase process it is generally advantageous to employ a vacuum during the latter portion of stage II. However, the excess glycol present in the powder can also be removed at higher pressures (such as at atmospheric pressure) by the passage of a stream of an inert gas over or through the powder. The temperature employed during the solid-phase portion of the reaction can be somewhat less than that employed when the process is conducted in accordance with the melt polymerization technique. Thus, a temperature from below 200° up to about 260° C. or higher can be advantageously employed.

The linear polyesters which can be produced in accordance with this invention are further illustrated by the following examples:

EXAMPLE I

Four hundred and twenty g. (1.0 mole) of 4,4'-sulfonyldibenzoic acid dibutyl ester and 208 g. (2.0 moles) of 2,2-dimethylpropanediol were placed in a reaction vessel equipped with a stirrer, a short distilling column, and an inlet tube for purified nitrogen. A solution of 0.2 g. sodium titanium butoxide in 5 cc. of butanol was added as catalyst. The mixture was stirred at 200–220° C. in an atmosphere of pure nitrogen. Butyl alcohol was distilled from the reaction as the ester interchange proceeded. After 6–8 hours, the evolution of butyl alcohol had practically stopped and the temperature was raised to 270–280° and held for 10 minutes. A vacuum of 0.05 mm. was then applied and stirring was continued for 5–10 minutes, during which time the polymer reached an inherent viscosity of about 0.2 as measured in a solution of 60% phenol–40% tetrachloroethane. The polymer was then removed from the vessel and allowed to cool. This prepolymer was ground to a powder that passed a 60-mesh screen, and dried at 110° C. for 2 hours. The powdered prepolymer was then heated in vacuum at 160° C. for 1 hour, at 225° C. for 1 hour, and at 260° C. for two hours. The product had an inherent viscosity of 0.80 as determined in a solution of 60% phenol–40% tetrachloroethane.

The melting point of the polymer as determined on the hot stage of a polarizing microscope was 300–310° C.

This polymer gave strong, elastic fibers when spun by the melt process. This polyester is of particular value for the manufacture of photographic film base. When extruded by the melt process, the film produced showed a heat distortion temperature of 134–140° C. This is a very unexpected property, because the polyester made from 1,5-pentanediol (an isomer of 2,2-dimethylpropanediol) has a heat distortion temperature of 80°–87° C. when extruded under similar conditions. The film made from 1,5-pentanediol polyester must be drafted and heat treated in order to attain a heat distortion temperature approaching 140° C. The solubility of this polyester is shown in the table below.

EXAMPLE II

Four hundred and twenty g. (1.0 mole) of 4,4'-sulfonyldibenzoic acid, 55.5 g. (0.25 mole) of diethyl isophthalate, and 208 g. (2.0 moles) of 2,2-dimethylpropanediol were placed in a reaction vessel as described in Example I. A solution of 0.2 g. magnesium titanium ethoxide in 10 cc. of ethanol was added as catalyst. The reaction mixture was stirred at 210–220° C. in a stream of pure nitrogen until the distillation of butyl alcohol and ethyl alcohol was 80% complete. The temperature was then raised to 270–275° C. and held for 15 minutes. A vacuum of 0.05 mm. was applied and stirring was continued for 1 hour. A high viscosity melt was obtained.

The polyester had an inherent viscosity of 0.70. The melting point was 290–295° C. for the crystalline polymer. This polyester is useful as photographic film base. It can be molded by the usual injection and compression methods. It is useful as an electrical insulator.

The polymer is soluble in tetrachloroethane and trichloroethane. It is very unusual to find a polyester, with such a high melting point, to be soluble in these solvents. Films can be cast from the solutions. The polymer is also soluble in gamma-butyrolactone, formanilide, and pyrrolidone.

EXAMPLE III

A polyester was made employing the process described in Example II having the composition 1 mole 4,4'-sulfonyldibenzoic acid+0.75 mole 2,2-dimethylpropanediol +0.25 mole tetramethylene glycol. It melted at 260–270° C. It was soluble in valerolactone, butyrolactone, formanilide, and tetrachloroethane. This polyester is especially valuable as a photographic film base and electrical insulator.

EXAMPLE IV

A polyester of 4,4'-sulfonyldibenzoic acid and 2,2-dimethyl-1,5-pentanediol was made employing the process described in Example II. This polyester melted at 220–230° C. and was soluble in trichloroethane and tetrachloroethane.

EXAMPLE V

A polyester was made having the composition 0.5 mole 4,4'-sulfonyldibenzoic acid+0.5 mole azelaic acid+1.0 mole 2,2-dimethylpropanediol was made employing the process described in Example II. It was soluble in ethylene dichloride and films cast from the solution softened at 120–130° C.

EXAMPLE VI

The polyester made from 2,2-dimethyl-1,4-butanediol and 4,4'-sulfonyldibenzoic acid was made employing the process described in Example II. It was soluble in tetrachloroethane and gave strong films when cast from the solution. The polymer is valuable as photographic film base and as an electrical insulating material. This polyester melted at 270–280° C.

EXAMPLE VII

A polyester having the composition 1 mole 4,4'-sulfonyldibenzoic acid+0.5 mole trimethylene glycol+0.5 mole 2,2-dimethylpropanediol was made employing the process described in Example II. It had a melting point of 270–280° C. Film extruded from this polyester had a heat distortion temperature of 140–150° C. It is especially valuable as a photographic film base.

Solubility properties

To illustrate the greatly improved solubility of the new polyesters provided herein, the solubilities of two polymers are compared in the table presented below. Polyester A in this table had a composition derived from one mole of 4,4-sulfonyldibenzoic acid+1 mole of 1,5-pentanediol. Polyester B had a composition derived from 1 mole of 4,4'-sulfonyldibenzoic acid+1 mole of 2,2-dimethyl-1,3-propanediol (the preparation of this polyester is described in Example 1). The glycols employed in each of these polyesters are isomeric; hence, the two polyesters have approximately the same melting points. In determining the relative solubilities, a 10% solution of the polyester was made by heating the polyester in the particular solvent being tested at a temperature of from 100° to 180° C. until a clear solution was obtained. The solution was then cooled slowly and the temperature at which the polymer separated from the solution was noted. In the following table the greater solubilities are readily apparent by the lower temperatures of precipitation.

| Solvent | Precipitation Temperature | |
| --- | --- | --- |
| | Polyester A (SDBA+1,5-Pentanediol) | Polyester B (SDBA+DMPD) |
| Valerolactone | 160° C | 110° C. |
| Butyrolactone | 152° C | 90° C. |
| Dimethylsulfolane | 170° C | 100° C. |
| Dimethylacetamide | insol | 90° C. |
| Diethylacetamide | insol | 60° C. |
| Pyrrolidone | 170° C | 125° C. |
| Tetrachloroethane | insol | sol. at 20° C. |

As can be seen from the data in the preceding table, polyester B derived from neopentylene glycol stays in solution at much lower temperatures than does polyester A which is derived from the isomeric straight chain glycol. Furthermore, polyester B is readily soluble in solvents which will not dissolve polyester A even at high temperatures. The wide solubility range of the gem-dialkyl glycol sulfonyldibenzoate polyesters is a quite advantageous and valuable property because films, fibers, and other shaped products can readily be made from solutions of these polyesters under a variety of conditions which can be adapted to commercial operations.

Resistance to hydrolysis

Another important property of polyester fibers and films is their resistance to degradation by hydrolysis. It has been found that polyesters made from sulfonyldibenzoic acid and 2,2-dimethylpropanediol are much superior to those made from straight chain glycols, in this respect. In the table below, comparative hydrolysis rates (loss of viscosity) are given for films in water at 90° C.

| Polyester | Original | 1 Week | 2 Weeks | 3 Weeks |
| --- | --- | --- | --- | --- |
| A (SDBA+1,5 Pentanediol) | 0.59 | 0.41 | 0.34 | 0.26 |
| B (SDBA+DMPD) | 0.55 | 0.52 | 0.48 | 0.46 |

From the data it is seen that the pentanediol polyester retained only 44% of its original viscosity, while the dimethylpropanediol polyester retained 84% of its original viscosity.

Properties of films

It is especially advantageous to form films from the polyesters of this invention by extrusion by means of a conventional screw extruder through a flat die so as to form a sheet of any desired width and thickness. It is quite advantageous to extrude such a sheet while still in its fluid form onto the polished chrome plated surface of a rotating roll which is heated by oil circulating therein. The thickness of the sheet can be controlled by variation in the relative speeds in the extrusion and the heated roll. An advantageous variation in this procedure for forming a sheet or film involves extruding the fluid sheet from a dye having lips protruding between two polished heated rolls whose distance apart controls the thickness and the surface finish of the sheet. The temperature of the rolls is advantageously adjusted so that the sheet adheres slightly to the rolls whereby the sheet when it leaves the rolls has a rigid self-supporting quality.

The extruded sheet must be brought to a temperature low enough so that the sheet is self-supporting, and this was done by contacting the sheet on one side or on both sides with a polished, rotating roll or rolls whose temperature was controlled by means of an internally circulating oil. The quenching may also be accomplished by other convenient means such as immersion in a liquid, a cooling gas such as air or nitrogen, or by using an endless belt instead of a roll or rolls. The surface quality of the sheet is controlled to a considerable degree by the character of the surface of the roll or rolls, and thickness may be advantageously controlled by use of two rolls between which the hot plastic is extruded. The quenched film is then wound and is ready for use.

In a large number of experiments, the extrusion temperatures ranged from 175° C. to 350° C. and the roll temperatures between 65° and 155° C. The choice of temperature depends upon the material used, the throughput rate, the die design, the dimensions of the rolls and their speed, among other factors.

These techniques were employed to prepare sheets or films of a number of the polyesters produced as described in the examples presented hereinabove as well as other polyesters coming within the scope of this invention in accordance with the principles set forth hereinabove.

The physical properties of a number of these polyesters in their sheet form were determined by standard testing techniques and are tabulated in the series of tables presented below. SDBA represents 4,4'-sulfonyldibenzoic acid and DMPD represents 2,2-dimethyl-1,3-propanediol.

In these tables the various dibasic acids and their mole fraction of the total acids employed are listed. These modifying acids were generally employed as dialkyl esters in the processes for preparing the various polyesters that are listed in the table (see the examples above for their preparation). In the tables the corresponding properties of polyesters made from a straight chain glycol are tabulated for comparative purposes.

In some instances a comparison is made with commercially available films which serve as a good basis for comparison. The heat distortion temperature is that at which the elongation of a specimen under a tensile load of 50 p.s.i. is 2%, the specimen being placed in a forced-convection air oven, the air temperature rising at the rate of 1.5° C. per minute.

The data presented in the table on "Physical Properties of Polymer Films" can be readily evaluated by those familiar with the characteristics of polymers and films prepared therefrom. The superior quality of the polyesters of this invention is apparent. A high heat distortion temperature is especially valuable for practical applications such as in motion picture film. Superior fold and tear resistance is useful for photographic film, wrapping materials, adhesive tapes, magnetic sound-reproducing tapes, etc.

Another table hereinbelow presents data on the "Electrical Properties of Polymer Films." It is evident that polymers derived from 2,2-dimethyl-1,3-propanediol and sulfonyldibenzoic acid have practically no change in dielectric constants over wide temperature ranges. The same is true for the loss or dissipation factors. The polyesters of this invention are therefore more valuable for use as insulating materials and as condenser dielectrics because their properties tend to remain constant over wide temperature ranges. These properties coupled with those previously described further illustrate the outstanding utility of the polyesters of this invention.

The various advantageous properties described are especially noteworthy when it is considered that films of the polyesters of this invention can be used in the as-extruded condition without necessity for cold-drawing and heat treating. The polyester films of this invention do not need to be drawn in either direction and have excellent heat-distortion characteristics in the as-extruded condition.

Furthermore, these polyesters are difficult to crystallize, so there is little tendency for them to become brittle with aging. It is well known in the art that high heat distortion temperatures are generally obtainable by causing a considerable degree of crystallization to take place in the sheet or film. In order to avoid brittleness which

ELECTRICAL PROPERTIES OF POLYMER FILMS

| Composition of Film (Constituents in polymer) | Dielectric Constant (at temp. shown) | | | | Loss or Dissipation Factor (percent) (at temperature shown) | | |
|---|---|---|---|---|---|---|---|
| | 25° C. | 75° C. | 95° C. | 115° C. | 25° C. | 75° C. | 100° C. |
| 1. SDBA+DMPD | 3.4 | 3.4 | 3.4 | 3.3 | .30 | .17 | .18 |
| 2. SDBA.83+Isophthalic.17+DMPD | 3.3 | 3.2 | 3.2 | 3.2 | .34 | .21 | .18 |
| 3. SDBA.83+Terephthalic.17+DMPD | 3.3 | 3.3 | 3.3 | 3.3 | .30 | .22 | .19 |
| 4. SDBA.83+Succinic.17+DMPD | 3.5 | 3.5 | 3.5 | 4.6 | .46 | .34 | 1.3 |
| 5. SDBA.83+Dimethylmalonic.17+DMPD | 3.4 | 3.4 | 3.3 | 3.3 | .21 | .14 | .16 |
| 6. SDBA+1,5-Pentanediol | 4.4 | 4.4 | 4.4 | 4.5 | .13 | .13 | .5 |
| 7. SDBA.83+Succinic.17+1,5-Pentanediol | 3.6 | 3.6 | 3.9 | 5.3 | .18 | .75 | 5.7 |
| 8. Terephthalic acid+DMPD | | | | | .50 | 3.8 | 2.0 |

Note.—No films were drafted, tentered and heat-set except films Nos. 6, 7 and 8.

PHYSICAL PROPERTIES OF POLYMER FILMS

| Composition of Film (Constituents in polymer) | Yield Stress (p.s.i. at Temp. shown) | | | Young's Mod. of Elasticity (100,000 p.s.i. at Temp. shown) | | | Heat Distortion, Temp., ° C. | Schopper Folds (5 mil. sheets) | Elmendorf Tear Strength (5 mil. sheets), g. |
|---|---|---|---|---|---|---|---|---|---|
| | 25° C. | 100° C. | 125° C. | 25° C. | 100° C. | 125° C. | | | |
| 1. SDBA+DMPD | 7,300 | 5,600 | 4,600 | 2.3 | 2.1 | 1.7 | 140 | | 195 |
| 2. SDBA.83+Isophthalic.17+DMPD | 7,700 | 5,700 | 5,000 | 2.0 | 1.9 | 1.9 | 129 | 48 | 170 |
| 3. SDBA.83+Terephthalic.17+DMPD | 8,000 | 5,600 | 5,500 | 2.2 | 1.8 | 2.4 | 136 | 58 | |
| 4. SDBA.83+Succinic.17+DMPD | | | | | | | 119 | | |
| 5. SDBA.83+Dimethylmalonic.17+DMPD | | | | | | | 129 | | |
| 6. SDBA+1,5-Pentanediol | | | | | | | 87 | | |
| 7. SDBA.83+Succinic.17+1,5-Pentanediol | 10,000 | 3,700 | 2,500 | 3.2 | 1.9 | 0.9 | 65 | 20 | 50 |
| 8. Cellulose acetate | | | | | | | | | |
| 9. Terephthalic acid+DMPD | | | | | | | 95 | | |

Note.—No films were tentered, drafted and heat set (to improve their properties) except films No. 6, No. 7 and No. 9.

accompanies the introduction of crystallization, it is considered necessary to orient the polyesters prior to crystallization. This is the case, for example, with polyethylene terephthalate, with polyesters derived from sulfonyldibenzoic acid+1,5-pentanediol, and with polyesters of terephthalic acid+2,2-dimethyl-1,3-propanediol.

The properties as presented herein illustrate the advantages of the polyesters of this invention in the as-extruded condition and show that they are quite suitable for photographic film support, packaging purposes, and other uses for which a high-heat distortion, good tear strength, good tensile strength and good toughness are required. These properties are insignificantly affected by the presence of water such as encountered at high humidities.

We claim:

1. A highly polymeric linear polyester capable of being melt extruded into fibers and film which are useful in their form as extruded and cooled without necessity for stretching and heat treatment, said polyester being composed essentially of from 50 to 100 mole percent of primary recurring ester units having the formula:

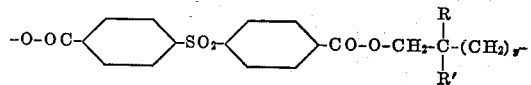

(Formula A)

and from 0 to 50 mole percent of secondary copolymeric recurring ester units selected from the group consisting of units having formulas selected from the group consisting of

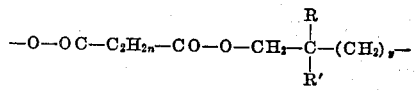

(Formula B)

and

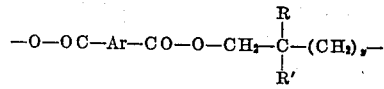

(Formula C)

wherein R and R' each represents a radical selected from the group consisting of ethyl and methyl radicals, $y$ represents a positive integer of from 1 to 3, $n$ represents a positive integer of from 2 to 18 and Ar represents a divalent aromatic radical containing from 6 to 18 carbon atoms which is connected to the carbonyl constituents as shown in Formula C by direct attachment to a carbon atom of a benzene ring, said polyester being characterized in that it can be melt-extruded and quenched to form substantially amorphous fibers and film which crystallize only with great difficulty, have heat distortion temperatures above 100° C. and also retain other useful chemical, physical and electrical properties at temperatures of at least 100° C. without substantial crystallization.

2. A polyester as defined by claim 1 which contains secondary recurring units which have the formula:

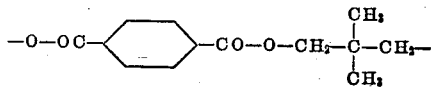

3. A polyester as defined by claim 1 which contains up to 30 mole percent of secondary recurring units which have the formula:

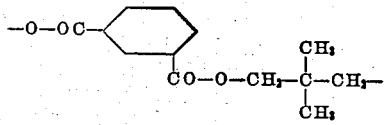

4. A polyester as defined by claim 1 which contains secondary recurring units which have the formula:

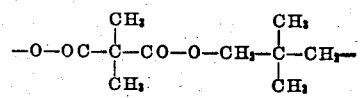

5. A polyester as defined by claim 1 which contains up to 30 mole percent of secondary recurring units which have the formula:

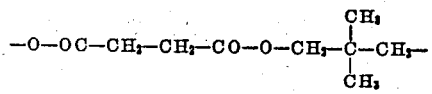

6. A polyester as defined by claim 1 wherein the primary recurring units have the formula:

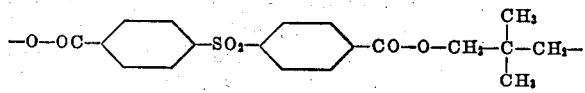

7. A film formed by extrusion at an elevated temperature consisting of a polyester as defined by claim 1.

8. A film formed by extrusion at an elevated temperature consisting of a polyester as defined by claim 2.

9. A film formed by extrusion at an elevated temperature consisting of a polyester as defined by claim 3.

10. A film formed by extrusion at an elevated temperature consisting of a polyester as defined by claim 4.

11. A film formed by extrusion at an elevated temperature consisting of a polyester as defined by claim 5.

12. A film formed by extrusion at an elevated temperature consisting of a polyester as defined by claim 6.

References Cited in the file of this patent

UNITED STATES PATENTS

| | | |
|---|---|---|
| 2,614,120 | Caldwell | Oct. 14, 1952 |
| 2,643,989 | Auspros | June 30, 1953 |
| 2,706,722 | Caldwell | Apr. 19, 1955 |
| 2,720,507 | Caldwell | Oct. 11, 1955 |
| 2,744,088 | Caldwell | May 1, 1956 |

FOREIGN PATENTS

| | | |
|---|---|---|
| 588,833 | Great Britain | June 4, 1947 |
| 620,494 | Great Britain | Mar. 25, 1949 |
| 644,287 | Great Britain | Oct. 11, 1950 |

OTHER REFERENCES

Hill et al.: Journal Polymer Science 3, 609–630 (1948). (Copy in Sci. Libr.)